US009213456B2

(12) United States Patent
Fujioka et al.

(10) Patent No.: US 9,213,456 B2
(45) Date of Patent: Dec. 15, 2015

(54) DISPLAY DEVICE, DRIVE METHOD THEREFOR, PROGRAM, AND RECORDING MEDIUM

(75) Inventors: Akizumi Fujioka, Osaka (JP); Mikihiro Noma, Osaka (JP); Akinori Kubota, Osaka (JP); Kohji Ogata, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 83 days.

(21) Appl. No.: 13/979,706

(22) PCT Filed: Jan. 13, 2012

(86) PCT No.: PCT/JP2012/050636
§ 371 (c)(1),
(2), (4) Date: Jul. 15, 2013

(87) PCT Pub. No.: WO2012/099025
PCT Pub. Date: Jul. 26, 2012

(65) Prior Publication Data
US 2013/0293515 A1     Nov. 7, 2013

(30) Foreign Application Priority Data

Jan. 20, 2011   (JP) ................................. 2011-010176

(51) Int. Cl.
*G06F 3/044*   (2006.01)
*G09G 3/36*    (2006.01)
(52) U.S. Cl.
CPC .............. *G06F 3/044* (2013.01); *G09G 3/3648* (2013.01); *G09G 2310/027* (2013.01); *G09G 2310/0235* (2013.01)

(58) Field of Classification Search
CPC .... G06F 3/044; G09G 3/3648; G09G 3/3688; G09G 2310/027; G09G 2310/0235; G09G 2310/02; G09G 2310/0202; G09G 2310/0218; G09G 2310/0264; G09G 2310/08
USPC .................... 345/99, 100, 173, 174, 691, 693
See application file for complete search history.

(56) References Cited

U.S. PATENT DOCUMENTS 6,509,887 B1 *  1/2003  Kondoh et al. ................. 345/87
7,804,473 B2 *  9/2010  Kumeta .......................... 345/96
8,232,943 B2 *  7/2012  Park ............................... 345/88
(Continued)

FOREIGN PATENT DOCUMENTS

CN   101339313 A   1/2009
EP   0 589 498 A1  3/1994
(Continued)

OTHER PUBLICATIONS

Official Communication issued in International Patent Application No. PCT/JP2012/050636, mailed on Feb. 7, 2012.

*Primary Examiner* — Tom Sheng
(74) *Attorney, Agent, or Firm* — Keating & Bennett, LLP

(57) ABSTRACT

The source driver (20) of the present invention substantially evenly divides one (1) horizontal scanning period into sub-periods the number of which is equal to or larger than a multiple of the number of the primary colors. In each of sub-periods (i) which are among all the sub-periods and (ii) the number of which is identical with the multiple, a source signal is supplied to source lines (i) which are connected with pixels for displaying a certain primary color and (ii) the number of which is obtained by dividing a total number of the plurality of source lines by the multiple.

1 Claim, 12 Drawing Sheets

(56) References Cited

U.S. PATENT DOCUMENTS

| | | | |
|---|---|---|---|
| 8,681,121 B2* | 3/2014 | Esaka et al. | 345/174 |
| 2002/0030648 A1* | 3/2002 | Yamamoto et al. | 345/87 |
| 2003/0090451 A1 | 5/2003 | Ahn | |
| 2004/0145581 A1* | 7/2004 | Morita | 345/204 |
| 2007/0090347 A1* | 4/2007 | Park et al. | 257/40 |
| 2007/0146269 A1* | 6/2007 | Hoshino | 345/88 |
| 2009/0009486 A1 | 1/2009 | Sato et al. | |
| 2011/0205194 A1* | 8/2011 | Takahashi et al. | 345/204 |
| 2012/0146972 A1* | 6/2012 | Fujikawa | 345/206 |

FOREIGN PATENT DOCUMENTS

| | | |
|---|---|---|
| JP | 06-187082 A | 7/1994 |
| JP | 2000-089912 A | 3/2000 |
| JP | 2003-280616 A | 10/2003 |
| JP | 2004-170766 A | 6/2004 |

* cited by examiner

DISPLAY DEVICE, DRIVE METHOD THEREFOR, PROGRAM, AND RECORDING MEDIUM

TECHNICAL FIELD

The present invention relates to a display device, a method for driving the display device, a program, and a storage medium. Specifically, the present invention relates to a display device including a capacitance type touch panel, a method for driving the display device, a program, and a storage medium.

BACKGROUND ART

Currently, a liquid crystal display device including a liquid crystal panel is widely used in various kinds of electronic apparatuses such as a mobile phone, a personal computer, and a music player. The liquid crystal display device includes (i) a liquid crystal panel in which liquid crystal cells are arranged in a matrix manner and (ii) a driving circuit for driving the liquid crystal panel. The liquid crystal display device displays an image by adjusting optical transmittance of liquid crystal by utilizing an electric field.

Specifically, the liquid crystal panel includes (i) a plurality of gate lines, (ii) a plurality of source lines, (iii) thin film transistors (TFTs) which are provided at respective intersections of the plurality of gate lines and the plurality of source lines, and (iv) liquid crystal cells connected with the respective TFTs so as to constitute respective pixels. Each of the TFTs has (i) a gate electrode connected with any one of the plurality of gate lines and (ii) a source electrode connected with any one of the plurality of source lines so that a pixel voltage signal is supplied to a liquid crystal cell via a source line in response to a scan signal supplied via a gate line. Each of the liquid crystal cells has a pixel electrode connected with a drain electrode of the TFT and a common electrode that faces the pixel electrode via liquid crystal. In the liquid crystal cell, the liquid crystal is driven in response to a pixel voltage signal supplied to the pixel electrode, and optical transmittance of the liquid crystal is thereby adjusted.

Typically, all the source lines provided in the liquid crystal panel are simultaneously driven during one (1) horizontal scanning period. On the other hand, a method is known in which the source lines are driven in a time division manner during one (1) horizontal scanning period. Such a method is disclosed in, for example, Patent Literature 1.

In recent years, electronic apparatuses are rapidly increased, each of which includes the liquid crystal display device with a touch panel. According to such an electronic apparatus, an input operation with respect to the electronic apparatus is carried out by pressing any of various operation buttons, which are displayed on a display screen, with a finger, a pen, or the like, instead of carrying out an input operation with the use of a conventional user interface such as a keyboard or buttons.

A capacitance type touch panel, which operates in one of operation principles of touch panel, operates by detecting a change of a sensor which change has been caused by electrostatic capacitance of a finger of human. However, in a case where a noise is caused while sensing, the noise will be detected. This leads to a decrease in recognizing performance of the touch panel.

Such a noise is generated when, for example, a liquid crystal module is driven which is provided on the back of the touch panel (hereinafter, such a noise is referred to as "liquid crystal drive noise"). In order to reduce or avoid the liquid crystal drive noise, the following measures have been taken, that is, for example, (i) a gap between the liquid crystal module and the touch panel is widened or (ii) a shield layer is provided between the liquid crystal module and the touch panel.

CITATION LIST

Patent Literature

Patent Literature 1
Japanese Patent Application Publication Tokukai No. 2003-280616 A (Publication date: Oct. 2, 2003)

SUMMARY OF INVENTION

Technical Problem

However, according to the measure in which the gap between the liquid crystal module, which generates the liquid crystal drive noise, and the touch panel is widened, the device becomes larger in size. Therefore, such a measure cannot be considered effective because the display device is currently demanded to have a reduced thickness. Moreover, the measure in which the shield layer is provided leads to an increase in cost.

Under the circumstances, the conventional measures for the liquid crystal drive noise are not sufficient, and development of a technique to further improve detection accuracy of the touch panel is demanded.

The present invention is accomplished in view of the problems, and its object is to provide a display device which can detect an input operation with high accuracy.

Solution to Problem

In order to attain the object, a display device of the present invention includes: a liquid crystal panel for displaying an image based on image data supplied from outside, the liquid crystal panel having a plurality of source lines, along each of which pixels are aligned for displaying an identical one of a plurality of different primary colors; a touch panel for detecting a change in electrostatic capacitance, the touch panel being provided so as to be attached to the liquid crystal panel; and source signal outputting means for outputting source signals, which correspond to the image data, to all the plurality of source lines during one (1) horizontal scanning period, the source signal outputting means substantially evenly dividing one (1) horizontal scanning period into sub-periods, the number of which is equal to or larger than a multiple of the number of the plurality of different primary colors, and in each of sub-periods (i) which are among all the sub-periods and (ii) the number of which is identical with the multiple, the source signal outputting means supplying a source signal to source lines (i) which are connected with pixels for displaying a certain one of the plurality of different primary colors and (ii) the number of which is obtained by dividing a total number of the plurality of source lines by the multiple.

In order to attain the object, a driving method of the present invention is a method for driving a display device including (i) a liquid crystal panel for displaying an image based on image data supplied from outside, the liquid crystal panel having a plurality of source lines, along each of which pixels are aligned for displaying an identical one of a plurality of different primary colors and (ii) a touch panel for detecting a change in electrostatic capacitance, the touch panel being provided so as to be attached to the liquid crystal panel, the method including the step of: outputting source signals, which correspond to the image data, to all the plurality of source lines during one (1) horizontal scanning period, in the outputting step, one (1) horizontal scanning period being substantially evenly divided into sub-periods, the number of which is equal to or larger than a multiple of the number of the plurality of different primary colors, and in each of sub-periods (i) which are among all the sub-periods and (ii) the number of which is identical with the multiple, a source signal being supplied, in the outputting step, to source lines (i) which are connected with pixels for displaying a certain one of the plurality of different primary colors and (ii) the number of which is obtained by dividing a total number of the plurality of source lines by the multiple.

According to the configuration, the display device includes the liquid crystal panel and the touch panel such that, in a case where a human finger or the like touches the liquid crystal panel, on which an image is displayed, via the touch panel, a location of the human finger or the like is detected by the touch panel. Each of the pixels of the liquid crystal panel is provided for displaying any of the plurality of different primary colors, and pixels, which are provided along one (1) source line, are pixels for displaying an identical primary color.

With the configuration, when the display device drives all the source lines during one (1) horizontal scanning period, the source lines are driven while the one (1) horizontal scanning period is substantially evenly divided into the sub-period, the number of which is equal to or larger than a multiple. Specifically, one (1) horizontal scanning period is substantially evenly divided into sub-periods the number of which is equal to or larger than the multiple of the number of primary colors, and in each of sub-periods (i) which are among all the sub-periods and (ii) the number of which is identical with the multiple, a source signal is supplied to source lines (i) which are connected with pixels for displaying a certain primary color and (ii) the number of which is obtained by dividing a total number of the plurality of source lines by the multiple.

As such, in a case where source signals are supplied while one (1) horizontal scanning period is substantially evenly divided, it is possible to concentrate peak frequency bands of a drive noise which is generated in the liquid crystal panel. As such, a drive noise is generated at substantially even intervals in one (1) horizontal scanning period, and it is therefore possible to easily cause the frequency of the noise to be different from a sensing frequency of the touch panel. This makes it possible to detect an input operation with high accuracy.

Advantageous Effects of Invention

The display device of the present invention includes: a liquid crystal panel for displaying an image based on image data supplied from outside, the liquid crystal panel having a plurality of source lines, along each of which pixels are aligned for displaying an identical one of a plurality of different primary colors; a touch panel for detecting a change in electrostatic capacitance, the touch panel being provided so as to be attached to the liquid crystal panel; and source signal outputting means for outputting source signals, which correspond to the image data, to all the plurality of source lines during one (1) horizontal scanning period, the source signal outputting means substantially evenly dividing one (1) horizontal scanning period into sub-periods, the number of which is equal to or larger than a multiple of the number of the plurality of different primary colors, and in each of sub-periods (i) which are among all the sub-periods and (ii) the number of which is identical with the multiple, the source signal outputting means supplying a source signal to source lines (i) which are connected with pixels for displaying a certain one of the plurality of different primary colors and (ii) the number of which is obtained by dividing a total number of the plurality of source lines by the multiple. This makes it possible to detect an input operation with high accuracy.

DESCRIPTION OF EMBODIMENTS

The following description will discuss an embodiment of the present invention. Note that the following description merely explains the present invention but does not limit the scope of the present invention.

(Configuration of Display Device)

Figure 1:
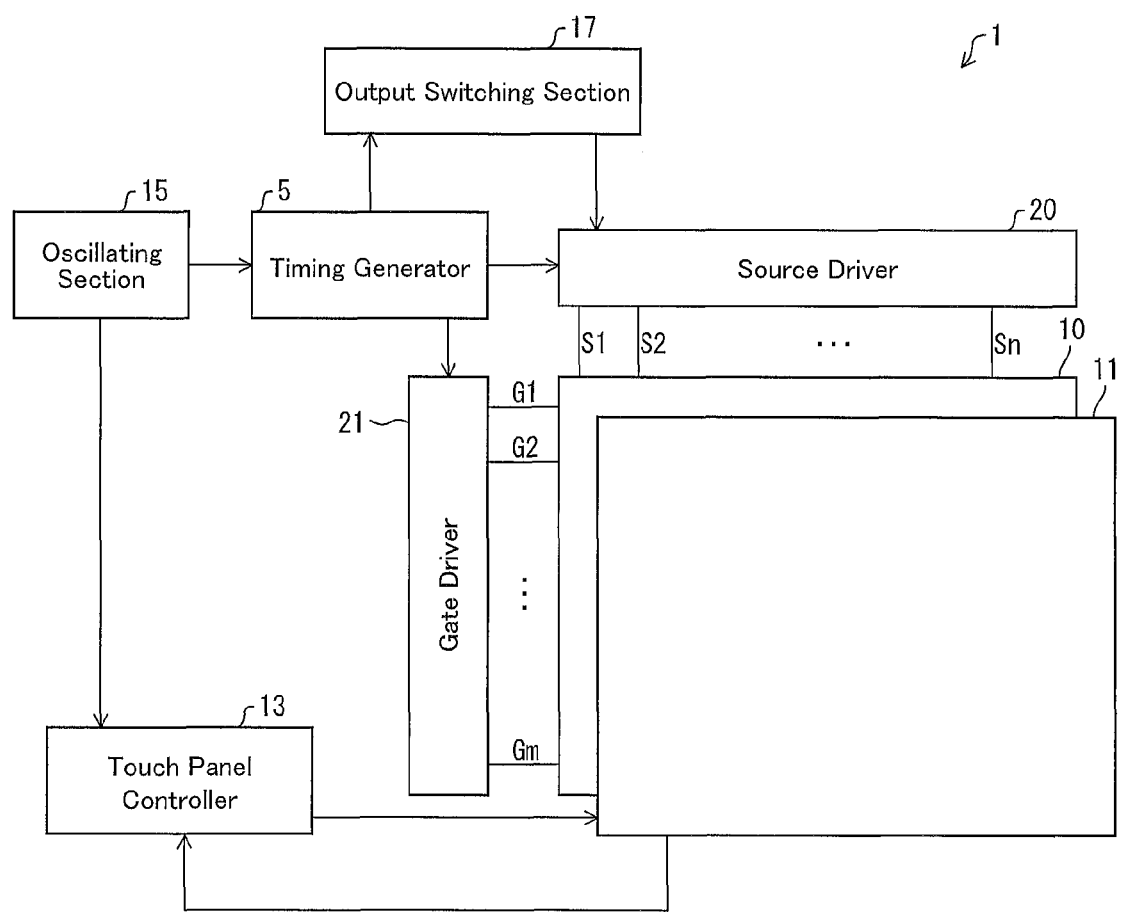
FIG. 1 is a view schematically illustrating a configuration of a display device, in accordance with an embodiment of the present invention.

FIG. 1 is a view schematically illustrating a configuration of a display device 1, in accordance with an embodiment of the present invention. The display device 1 of the present embodiment mainly includes a liquid crystal panel 10 and a touch panel 11.

The liquid crystal panel 10 includes (i) a plurality of source lines SL1, SL2, . . . SLn ("n" is a natural number; the source line SLn is indicated by "Sn" in FIG. 1) and (ii) a plurality of gate lines GL1, GL2, . . . GLm ("m" is a natural number; the gate line GLm is indicated by "Gm" in FIG. 1), which perpendicularly intersect with the plurality of source lines SL1 through SLn. In the liquid crystal panel 10, a plurality of pixels are provided, each of which is formed in an area demarcated by adjacent two source lines and adjacent two gate lines. The liquid crystal panel 10 displays an image corresponding to image data which supplied from outside.

Each of the plurality of pixels in the liquid crystal panel 10 is provided for displaying any of a plurality of different primary colors. In the display device 1, pixels for displaying an identical primary color are aligned along each of the source lines. That is, all pixels connected with one (1) source line are pixels for displaying the same primary color. Examples of the primary colors encompass red (R), green (G), blue (B), yellow (Y), and white (W).

The touch panel 11 is provided so as to be attached to the liquid crystal panel 10 and detects a change in electrostatic capacitance. Specifically, the touch panel 11 includes a sensor (not illustrated) for detecting a change in electrostatic capacitance. In a case where the touch panel 11 on the liquid crystal panel 10 is pressed with a human finger or the like, the touch panel controller 13 (later described) detects a change in electrostatic capacitance of the sensor, and a predetermined process is carried out so that a location which has been pressed by the human is detected.

According to the display device 1 having such a configuration, all the plurality of source lines are driven during one (1) horizontal scanning period (1H). In this case, one (1) horizontal scanning period is substantially evenly divided by a number, which is equal to or larger than a multiple of the number of primary colors, so that the driving is carried out per predetermined number of source lines. Specifically, one (1) horizontal scanning period is substantially evenly divided into sub-periods, the number of which is equal to or larger than a multiple of the number of primary colors. In each of sub-periods (i) which are among all the sub-periods and (ii) the number of which is identical with the multiple of the number of primary colors, a source signal is supplied to source lines (i) which are connected with pixels for displaying a certain primary color and (ii) the number of which is obtained by dividing a total number of the plurality of source lines by the multiple of the number of primary colors.

For example, in a case where the display device 1 has pixels for displaying 3 primary colors, i.e., R, G, and B, one (1) horizontal scanning period is substantially evenly divided into sub-periods the number of which is equal to or larger than a multiple of 3. Then, in each of sub-periods (i) which are among all the sub-periods and (ii) the number of which is identical with the multiple of 3, a source signal is supplied to source lines which are connected with, for example, pixels for displaying red (hereinafter, referred to as "red pixels"). Here, in a case where, for example, the total number of the plurality of source lines is 240 and one (1) horizontal scanning period is divided into 6 sub-periods, the source signal is to be supplied to 40 source lines connected with the red pixels, which 40 is obtained by dividing 240 by 6 (=a multiple of 3). With the configuration, for example, it is possible to alternately drive (i) odd-numbered ones and (ii) even-numbered ones of source lines which are connected with pixels for displaying a certain primary color.

Note that the display device 1 may be configured to simultaneously apply an identical voltage to all the source lines at the beginning of one (1) horizontal scanning period (details will be described later). Even in this case, one (1) horizontal scanning period in the present invention is divided by a number equal to or larger than the multiple of the number of primary colors. Specifically, the one (1) horizontal scanning period including a period during which the voltage is applied to all the source lines is substantially evenly divided. Therefore, all the sub-periods during which the source lines are driven in one (1) horizontal scanning period are substantially even periods.

Note that, in this specification, the wording "substantially even(ly)" indicates that a certain degree of error is acceptable, although it is mostly preferable to completely evenly divide one (1) horizontal scanning period into sub-periods. That is, a reference clock signal supplied from an oscillating section 15 (later described) can vary by approximately ±several percent to ±10%, due to individual differences such as (i) variations in device property caused by a change in circumstances such as temperature or (ii) variations of devices. The time division driving of source lines depends on accuracy of the reference clock signal. Under the circumstances, in the present invention, an error of ±several percent to ±10% is acceptable to period lengths of respective sub-periods, which are obtained by substantially evenly dividing one (1) horizontal scanning period.

All the source lines are driven during one (1) horizontal scanning period, and source lines, which have already been used to supply a source signal in the one (1) horizontal scanning period, are not selected again when a certain sub-period is shifted to a following sub-period.

In a case where, for example, (i) pixels are provided for displaying R, G, and B and (ii) one (1) horizontal scanning period is divided into 3 sub-periods for supplying source signals, a driving such as follows is carried out in one (1) horizontal scanning period: that is, in a case where source lines connected with red pixels are switched to source lines connected with green pixels, the source lines connected with green pixels will not be switched back to the source lines connected with red pixels again. Alternatively, in a case where, for example, source lines, which are connected with any of pixels for displaying R, G, and B, are divided into odd-numbered and even-numbered source lines, i.e., in a case where one (1) horizontal scanning period is divided into 6 sub-periods for supplying source signals, a driving such as follows will be carried out: that is, in a case where even-numbered ones of the source lines connected with red pixels are switched to odd-numbered ones of the source lines connected with green pixels, the odd-numbered ones of the source lines connected with green pixels will not be switched back to the even-numbered ones of the source lines connected with red pixels again.

As such, in a case where one (1) horizontal scanning period is substantially evenly divided and a source signal supply is switched per source lines connected with pixels for displaying an identical primary color, it is possible to cause peak frequency bands of a drive noise to be concentrated on a single polar, which drive noise is generated in the liquid crystal panel (details will be described later). As such, a drive noise is generated at substantially even intervals in one (1) horizontal scanning period, and it is therefore possible to easily cause the timings, at which the drive noise is generated, to be different from a sensing frequency of the touch panel 11. This makes it possible to detect an input operation with high accuracy.

Figure 2:
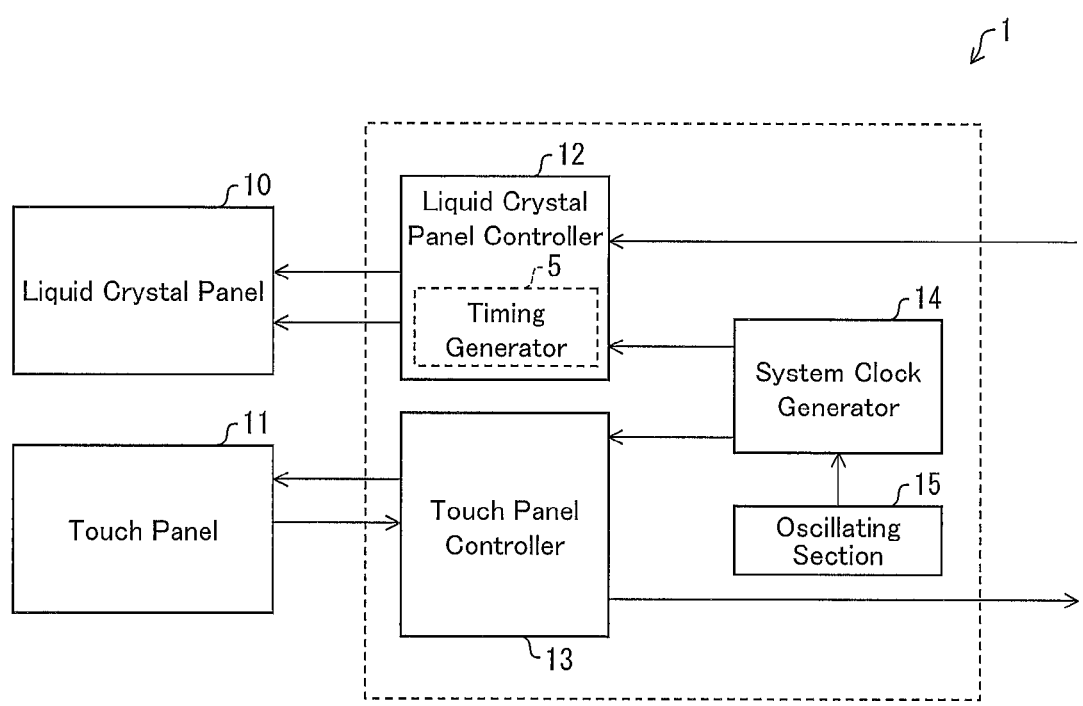
FIG. 2 is a block diagram illustrating a configuration of the display device illustrated in FIG. 1.

The following description will discuss each constituent members of the display device 1, with reference to FIGS. 1 and 2. FIG. 2 is a block diagram illustrating a configuration of the display device 1.

The display device 1 further includes a source driver 20 (source signal outputting means), a gate driver 21, a liquid crystal panel controller 12, a touch panel controller 13, a system clock generator 14, an oscillating section 15, and an output switching section 17, in addition to the liquid crystal panel 10 and the touch panel 11.

The source driver 20 is connected with the source lines SL1, SL2, . . . SLn and supplies source signals, which correspond to image data received from the liquid crystal panel controller 12, to the source lines. As early described, the source lines are connected with pixels for displaying a plurality of different primary colors. In the present embodiment, source lines connected with red pixels are referred to as "source lines SLR", source lines connected with green pixels are referred to as "source lines SLG", and source lines connected with blue pixels are referred to as "source lines SLB".

The source driver 20 is controlled by the output switching section 17 (later described) to substantially evenly divide one (1) horizontal scanning period into sub-periods by a number equal to or larger than the multiple of the number of primary colors. Moreover, in each of sub-periods (i) which are among all the sub-periods and (ii) the number of which is identical with the multiple of the number of primary colors, the source driver 20 is controlled by the output switching section 17 to supply a source signal to source lines (i) which are connected with pixels for displaying a certain primary color and (ii) the number of which is obtained by dividing the total number of the plurality of source lines by the multiple of the number of the primary colors.

The gate driver 21 is connected with the gate lines GL1, GL2, . . . GLm and supplies, to the gate lines, respective gate signals which have been received from the liquid crystal panel controller 12 and are signals for driving the liquid crystal panel 10.

The liquid crystal panel controller 12 generates a source signal based on image data which has been supplied from outside. The term "outside" indicates, for example, a host such as a CPU for controlling the constituent members of the display device 1. The liquid crystal panel controller 12 includes a timing generator 5 and sends, based on a clock signal received from the system clock generator 14, a generated source signal to the source driver 20. Moreover, the liquid crystal panel controller 12 generates a gate signal and sends the gate signal to the gate driver 21 based on a clock signal.

The timing generator 5 generates (i) a source clock (SCK) and a source start pulse (SSP) which are to be sent to the source driver 20 and (ii) a gate clock (GCK) and a gate start pulse (GSP) which are to be sent to the gate driver 21, based on (i) a clock signal (CLK) supplied from the system clock generator 14 and (ii) a horizontal sync signal (Hsync) and a vertical sync signal (Vsync) which are supplied from outside.

The touch panel controller 13 (i) transmits a signal to the touch panel 11 and (ii) receives data indicative of a change in signal which change is caused by a change in electrostatic capacitance that is generated when a target to be detected comes close to the sensor. Moreover, the touch panel controller 13 carries out, based on received data, an output of coordinates or gesture to the host side. In this case, it is preferable that the touch panel controller 13 detects a change in electrostatic capacitance at a timing which is different from a timing at which a source signal is supplied to the source lines. According to the present embodiment, a timing at which the touch panel controller 13 transmits a signal is based on a clock signal generated by the system clock generator 14. Note, however, that the present embodiment is not limited to this.

The system clock generator 14 (i) converts a reference clock signal supplied from the oscillating section 15 into signals having predetermined frequencies and (ii) supplies the signals to respective of the touch panel controller 13 and the liquid crystal panel controller 12. Specifically, the system clock generator 14 (i) converts the reference clock signal, which has been supplied from the oscillating section 15, into a clock signal which has a frequency suitable for the liquid crystal panel 10 and is used to drive liquid crystal and (ii) supplies the clock signal to the liquid crystal panel controller 12. Further, the system clock generator 14 (i) converts the reference clock signal, which has been supplied from the oscillating section 15, into a clock signal which has a frequency suitable for the touch panel 11 and is used to carry out sensing and (ii) supplies the clock signal to the touch panel controller 13.

The present embodiment is exemplified by the example in which the system clock generator 14 generates a clock signal for the touch panel 11 and a clock signal for the liquid crystal panel 10. Note, however, that the present embodiment is not limited to this, and clock signals may be supplied to respective of the liquid crystal panel controller 12 and the touch panel controller 13 from different sources.

A power source section or the like (not illustrated) supplies a voltage to the oscillating section 15 so that the oscillating section 15 generates a reference clock signal based on the voltage thus supplied. Then, the oscillating section 15 supplies the reference clock signal to the system clock generator 14.

The output switching section 17 switches source lines via which a source signal is to be supplied in one (1) horizontal scanning period. According to the present embodiment, display colors include the three primary colors of R, G, and B. In this case, the output switching section 17 switches an output of a source signal per (i) the plurality of source lines SLR, (ii) the plurality of source lines SLG, and (iii) the plurality of source lines SLB.

The output switching section 17 can carry out the switching of output by, for example, controlling the source driver 20 based on a signal from the timing generator 5 to supply a source signal only to predetermined source lines in each of divided periods (see FIG. 1). Alternatively, means (such as a switch) for switching output destinations can be provided for each of the source lines so that a source signal is supplied only to a source line which is being turned ON by the switch that is provided for turning ON/OFF the source line. In the latter case, the output switching section 17 does not necessarily control the source driver 20, and the output switching section 17 can be configured to control the switches. In this case, the switches can be considered to serve as the source signal outputting means of the present invention.

The display device 1 having the configuration described above is applicable to various kinds of display devices, each of which includes a touch panel, such as a mobile phone, a personal digital assistant (PDA), a portable game machine, a personal computer, a ticket vending machine, and a cash dispenser.

(Time Division Driving of Source Lines)

The following description will discuss a time division driving of source lines in the display device 1.

In this specification, the wording "time division driving of source lines" indicates a method in which (i) all the source lines are divided into groups of a predetermined number of source lines and (ii) driving is carried out with respect to source lines for each of the groups at different timings in one (1) horizontal scanning period. In other words, source signals are supplied to all the source lines by (i) dividing one (1) horizontal scanning period at predetermined intervals and (ii) switching a group to be driven at the beginning of each of divided periods. According to the present invention, one (1)

horizontal scanning period is divided substantially evenly. This allows an improvement in detection accuracy of the touch panel 11.

Figure 3:
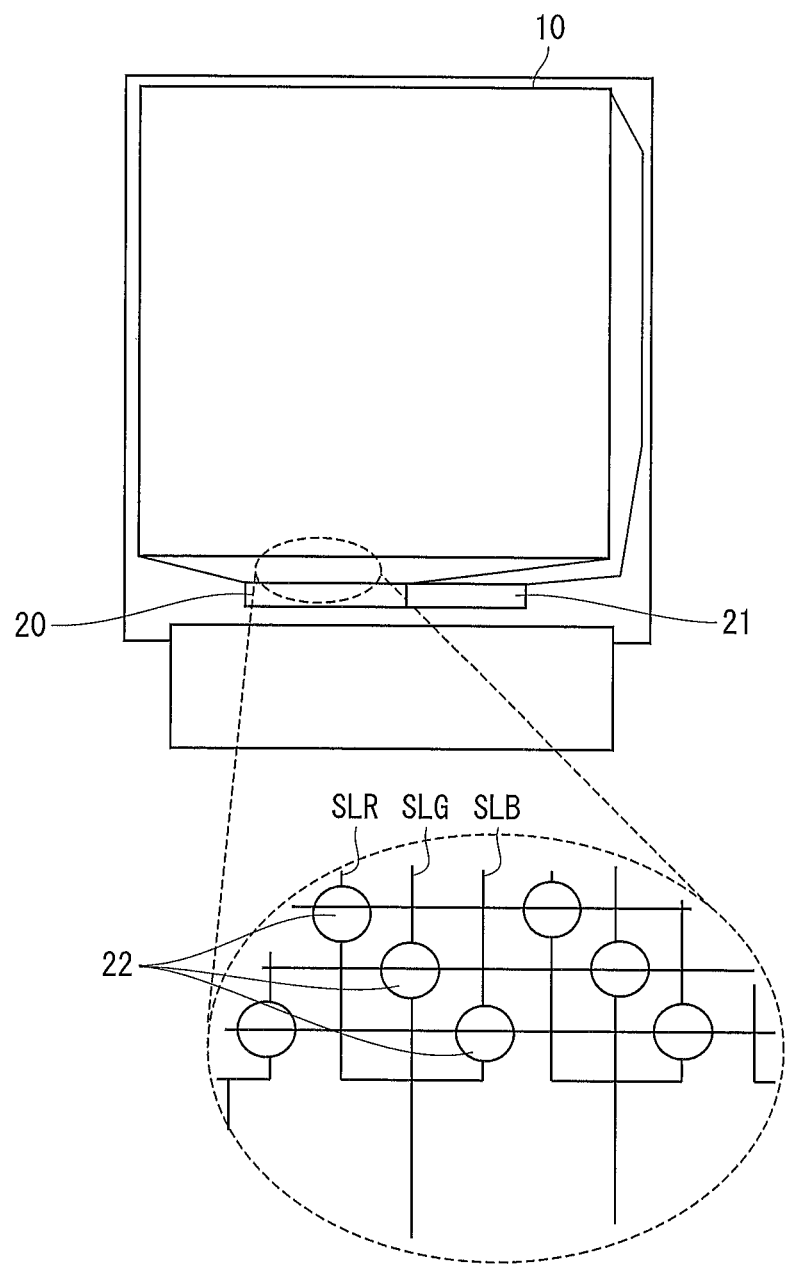
FIG. 3 is a view illustrating an example of a configuration for driving a plurality of source lines in a time division manner in the display device illustrated in FIG. 1.

FIG. 3 is a view illustrating an example of a configuration for driving a plurality of source lines in a time division manner in the display device 1.

In the example illustrated in FIG. 3, switches 22 are provided for the respective source lines SLR, SLG, and SLB of the liquid crystal panel 10 so that a time division driving is carried out with respect to the source lines SLR, SLG, and SLB. In order to carry out a time division driving for each group of adjacent three source lines, i.e., the source lines SLR, SLG, and SLB, each group of the source lines SLR, SLG, and SLB are bundled into one (at a lower part in a circled area in FIG. 3). Each bundle of source lines is connected with the source driver 20, and a source signal is supplied to the source lines from the source driver 20.

Lines which extend in a right-left direction in FIG. 3 and are connected with the switches 22 are switch selection lines connected with the output switching section 17. The output switching section 17 supplies a signal for controlling ON/OFF to each of the switches 22 via a corresponding one of the switch selection lines. Note that the term "ON" indicates a state where a source signal is supplied to a source line via a switch 22, and the term "OFF" indicates a state where a source signal to a source line is blocked by a switch 22.

For example, in a certain time period, a control signal is supplied for turning ON a switch 22 provided for the source line SLR, while control signals are supplied for turning OFF switches 22 provided for the respective source lines SLG and SLB. In this case, a source signal is supplied to the source line SLR at a timing when the switch 22 provided for the source line SLR is turned ON. Then, in a following time period, a control signal is supplied for turning ON the switch 22 provided for the source line SLG, while control signals are supplied for turning OFF the switches 22 provided for the respective source lines SLR and SLB. In this case, a source signal is supplied to the source line SLG at a timing when the switch 22 provided for the source line SLG is turned ON.

As such, by providing the switches 22 for driving the plurality of source lines in a time division manner, it is possible to reduce the number of output terminals of the source driver 20. This allows (i) a reduction in size of the device and (ii) a reduction in cost of the device.

Figure 4:
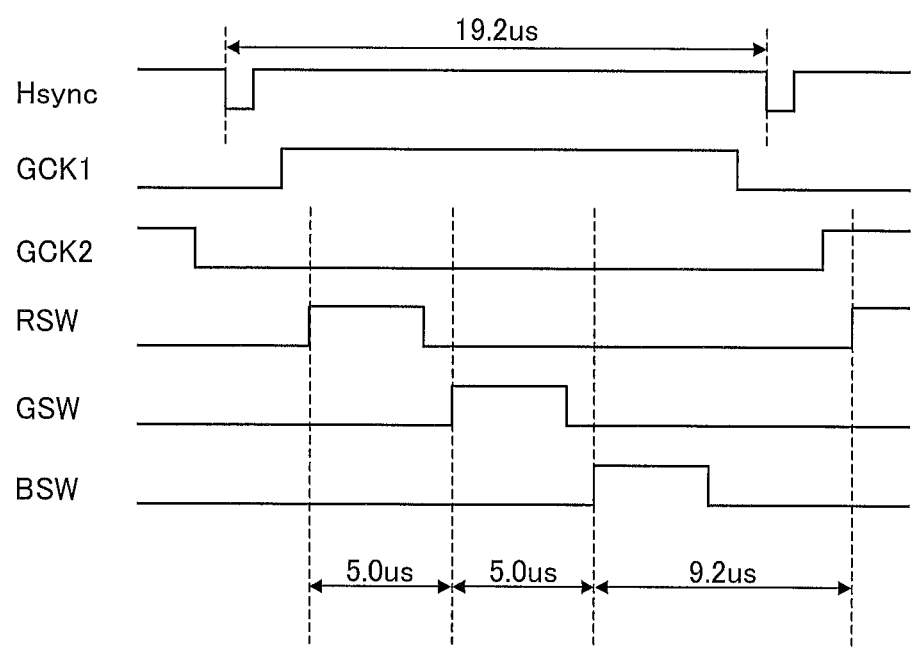
FIG. 4 illustrates a driving waveform of a conventional general time division driving of source lines.

FIG. 4 illustrates a driving waveform of a conventional general time division driving of source lines. In FIG. 4, "GCK" indicates a gate clock, "RSW" indicates a timing at which the switch 22 (hereinafter, referred also to as R switch) provided for the source line SLR is turned ON, "GSW" indicates a timing at which the switch 22 (hereinafter, referred also to as G switch) provided for the source line SLG is turned ON, and "BSW" indicates a timing at which the switch 22 (hereinafter, referred also to as B switch) provided for the source line SLB is turned ON.

According to the conventional method, an interval between timings for turning ON respective switches 22 is set to be longer than an interval between timings for turning ON respective other switches, in order to sufficiently secure charging time after a last switch in one (1) horizontal scanning period is turned ON. Specifically, in one (1) horizontal scanning period (Hsync: 19.2 us), an interval between R and G (which interval is a time period from when the R switch is turned ON to when the G switch is turned ON) and an interval between G and B (which interval is a time period from when the G switch is turned ON to when the B switch is turned ON) are identical intervals (i.e., 5.0 us). Meanwhile, an interval between B and a following R (which interval is a time period from when the B switch is turned ON to when an R switch in a following frame is turned ON) is 9.2 us, which is longer than each of the interval between R and G and the interval between G and B (see FIG. 4). In other words, according to this method, not all divided periods are even, which are obtained by dividing one (1) horizontal scanning period.

Figure 5:
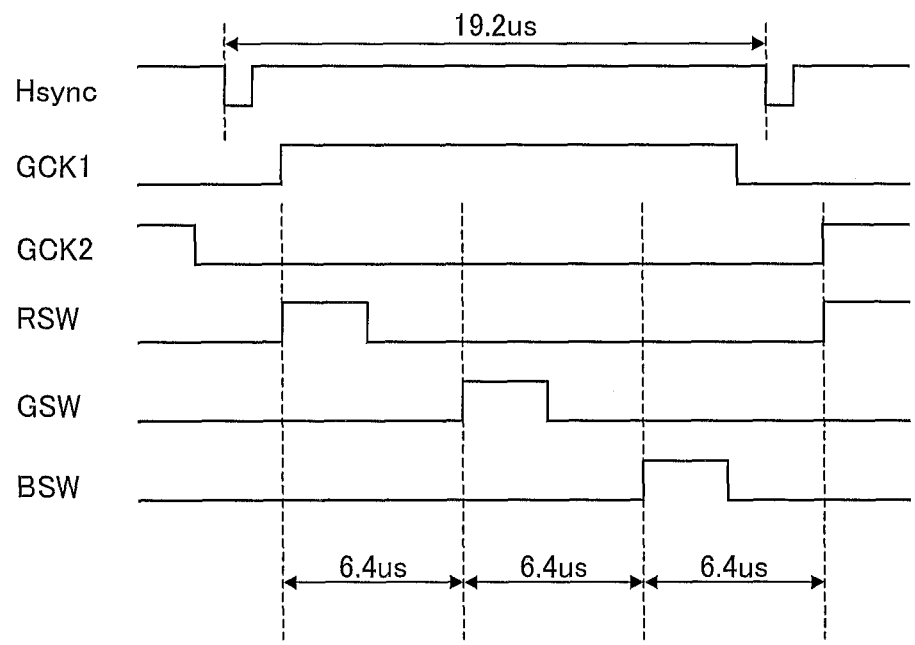
FIG. 5 illustrates driving waveforms of a time division driving of source lines in the present embodiment.

On the other hand, FIG. 5 illustrates driving waveforms of a time division driving of source lines in the present embodiment. According to the present embodiment, an interval between R and G (which interval is a time period from when the R switch is turned ON to when the G switch is turned ON), an interval between G and B (which interval is a time period from when the G switch is turned ON to when the B switch is turned ON), and an interval between B and a following R (which interval is a time period from when the B switch is turned ON to when an R switch in a following frame is turned ON) are identical time periods, i.e., 6.4 us (see FIG. 5). This allows a timing, at which a drive noise is generated, to be easily different from a frequency of a noise which is sensed by the touch panel 11. This makes it possible to solve the problem of drive noise which is caused when the touch panel 11 is attached to the liquid crystal panel 10.

Note that, according to the above description, one (1) horizontal scanning period is divided by the number of primary colors, i.e., substantially evenly divided into three sub-periods for R, G, and B, and a source signal is supplied to source lines which are connected with pixels for displaying any of R, G, and B. Note, however, that the present invention is not limited to this, and one (1) horizontal scanning period can be substantially evenly divided into sub-periods the number of which is equal to or larger than a multiple (such as once, twice, three times, and so forth) of the number of the primary colors so that a source signal is supplied for each of the sub-periods thus obtained. For example, in a case where source lines connected with pixels for displaying any of R, G, and B are further divided into even-numbered ones and odd-numbered ones for being driven, one (1) horizontal scanning period can be substantially evenly divided into 6 sub-periods for driving the source lines.

The present invention encompasses an aspect in which a predetermined voltage is supplied to all the plurality of source lines at the beginning of one (1) horizontal scanning period. It sometimes happens that a sufficient voltage is not supplied to pixels because source signals are supplied to the source lines in sub-periods obtained by dividing one (1) horizontal scanning period. In order to deal with this, a predetermined voltage is applied to all the plurality of source lines at the beginning of one (1) horizontal scanning period so that an intended voltage can be obtained when voltages corresponding to image data are later applied.

According to the present invention, one (1) horizontal scanning period is substantially evenly divided into sub-periods, the number of which is equal to or larger than the multiple of the number of primary colors as above described. Further, a time period during which a predetermined voltage is applied is included in the sub-periods. As such, in one (1) horizontal scanning period, all the sub-periods during which the source lines are driven have identical lengths, and it is therefore possible to easily cause a timing, at which a drive noise is generated, to be different from a frequency of a noise that is sensed by the touch panel 11.

The following description will discuss a principle of how a drive noise is generated in the liquid crystal panel 10.

(Generation Principle of Liquid Crystal Drive Noise)

Figure 6:
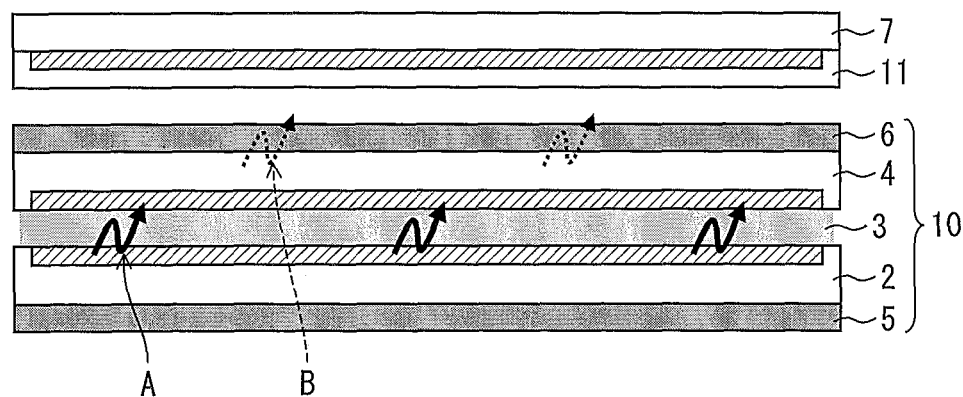
FIG. 6 is a view illustrating a state where a drive noise is generated in a liquid crystal panel included in the display device illustrated in FIG. 1.

FIG. 6 is a view illustrating a state where a drive noise is generated in the liquid crystal panel 10 provided in the display device 1.

The liquid crystal panel 10 includes (i) a TFT substrate 2 on which pixel switching elements (TFT) are provided so as to form pixel electrodes, (ii) a counter substrate 4 on which a counter electrode (COM electrode) is provided, and (iii) a liquid crystal layer 3 provided between the TFT substrate 2 and the counter substrate 4 (see FIG. 6). The touch panel 11 is provided on the counter substrate 4 via a polarizing plate 6.

In the liquid crystal panel 10, the counter electrode is an electrode common to all the pixels. Liquid crystal is oriented by effects of electric fields between the counter electrode and the pixel electrodes so as to transmit light or to block light.

Specifically, electric potentials, which correspond to an image to be displayed, are supplied from the source driver 20 and the gate driver 21 to the pixel electrodes, and a predetermined electric potential is supplied to the counter electrode. Whether to transmit or to block light is controlled for each pixel by turning ON/OFF a corresponding TFT. Further, a degree of voltage to be applied to liquid crystal is changed in accordance with source signals so as to provide bright pixels and dark pixels. In a case where the liquid crystal panel 10 carries out a full-color display as in the present embodiment, color filters each having any of colors R, G, and B are provided, for the respective pixels, to the counter substrate on which the counter electrode is provided. With the configuration, light which has passed through the liquid crystal and any of the color filters is to be emitted as colored light.

As early described, one of causes that decrease detection accuracy of an electrostatic capacitance type touch panel is a drive noise of a liquid crystal module that is provided in the vicinity of the back of the sensor. Under the circumstances, in order to improve detection accuracy of the touch panel, it is necessary to (i) reduce a level of liquid crystal drive noise or (ii) carry out sensing at a timing which is different from a timing at which the noise is generated. In other words, it is necessary to cause a frequency of the liquid crystal drive noise to be different from a frequency of noise sensed by the touch panel.

(Applied-Voltage-Time Characteristics of R, G, and B)

Figure 7:
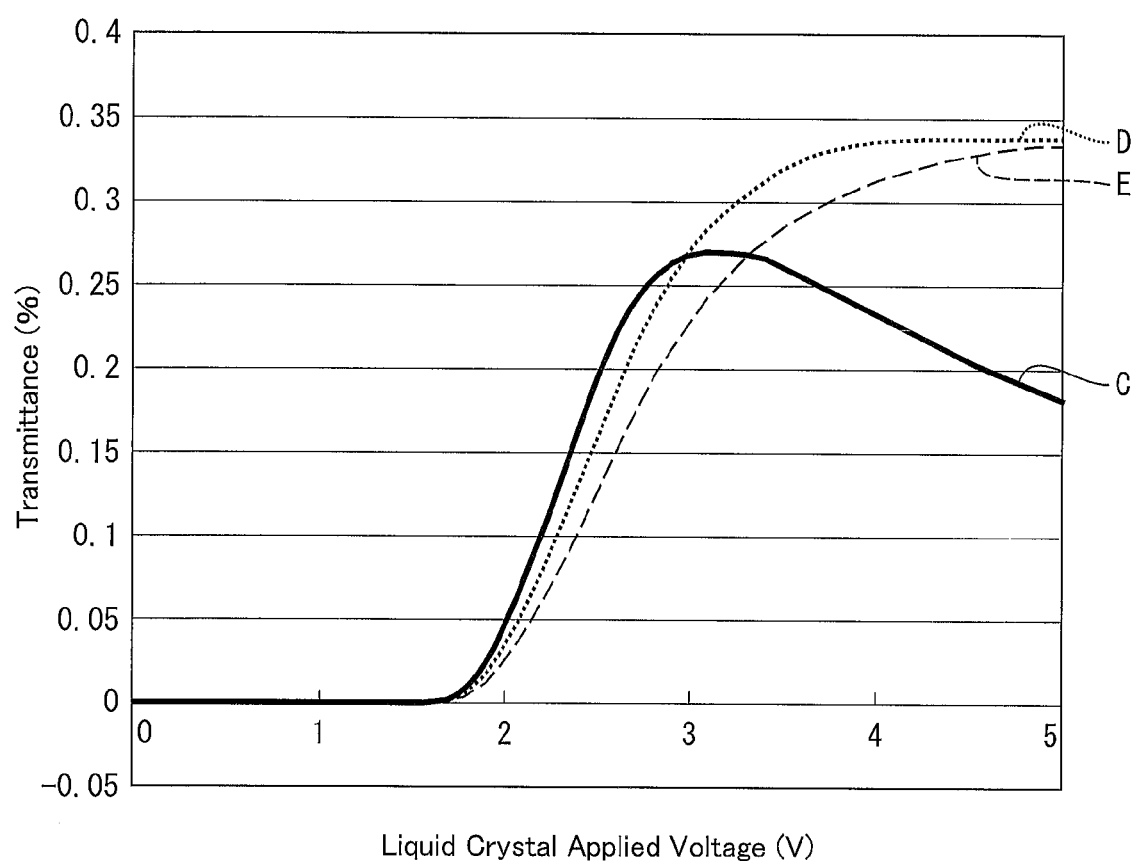
FIG. 7 is a graph illustrating an applied-voltage-time characteristics of R, G, and B.

FIG. 7 is a graph illustrating applied-voltage-time characteristics (hereinafter, referred to as "V-T characteristics") of R, G, and B. In FIG. 7, "C" indicates a V-T characteristic of blue (having a wavelength of 450 nm), "D" indicates a V-T characteristic of green (having a wavelength of 550 nm), and "E" indicates a V-T characteristic of red (having a wavelength of 650 nm).

According to the present invention, in a case where the source lines are driven for each of the primary colors in a time division manner, the source driver 20 preferably supplies the source signal to source lines that are connected with blue (B) pixels at the end of one (1) horizontal scanning period. In a case where, for example, one (1) horizontal scanning period is divided into three sub-periods for R, G, and B, it is preferable that source lines are driven in an order of R, G, and B or in an order of G, R, and B.

As indicated by the graph of FIG. 7, transmittances of green and red increase as a voltage applied to liquid crystal becomes higher, whereas a transmittance of blue, which has a peak at a voltage of 3 V, gradually decreases as an applied voltage becomes higher from 3 V. As such, according to the applied-voltage-time characteristics of R, G, and B, the transmittance of blue (B) reaches its peak at a voltage which is lower than voltages at which the transmittances of red (R) and green (G) reach their peaks.

According to the present invention, one (1) horizontal scanning period is substantially evenly divided and a voltage corresponding to each of the primary colors is applied to pixels for displaying the primary color. In this configuration, no voltage is applied to gate lines at the end of one (1) horizontal scanning period, and therefore charging time of pixels becomes shorter. However, in a case where a source signal is supplied to source lines connected with the blue (B) pixels, which can be sufficiently charged in short time, i.e., which has excellent response, in the last sub-period of one (1) horizontal scanning period, it is possible to display an intended color.

(Operation Principle of Touch Panel)

The following description will briefly discuss an operation principle of the touch panel 11 provided in the display device 1, with reference to drawings and descriptions of "Monthly DISPLAY 09, December (Techno Times Co. Ltd.)".

Figure 8:
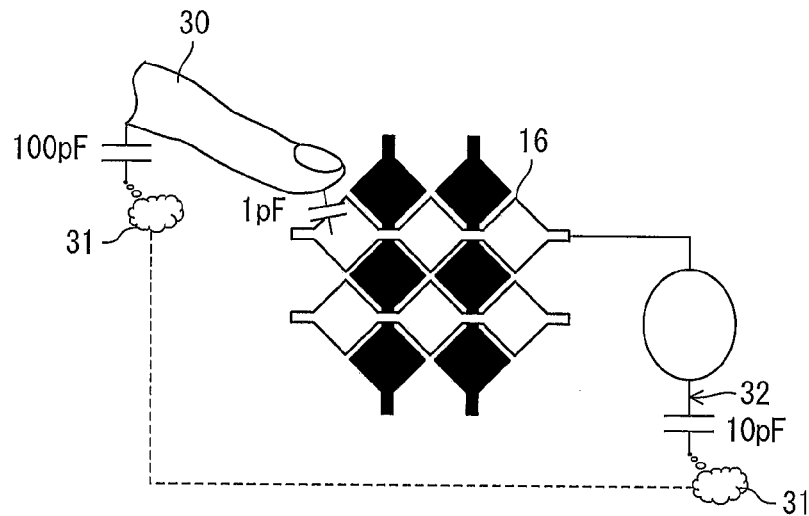
FIG. 8 illustrates an equivalent circuit of electrostatic capacitance between a sensor and a finger of human.

The touch panel 11 of the present embodiment is a capacitance type touch panel and detects a location, in which an input operation is carried out on the liquid crystal panel 10, by detecting a change in electrostatic capacitance with the sensor. FIG. 8 illustrates an equivalent circuit of electrostatic capacitance between the sensor 16 and a finger 30 of human.

There exists electrostatic capacitance of approximately 100 pF between a human body and ground 31 (or a ground environment common to the display device 1 and the human body). Meanwhile, there exists electrostatic capacitance of approximately 10 pF between the display device 1, in which the touch panel 11 is provided, and the ground 31. Therefore, the human body, the display device 1, and the ground 31 constitute a closed loop via electrostatic capacitances.

In a case where a finger 30, which is a part of the human body, touches the touch panel 11, electrostatic capacitance in the closed loop is changed by 1 pF due to the finger 30, because an electrostatic capacitance between the finger 30 and the sensor 16 is approximately 1 pF. When the sensor 16 detects the change thus caused, a contact of the finger 30 is detected.

Figure 9:
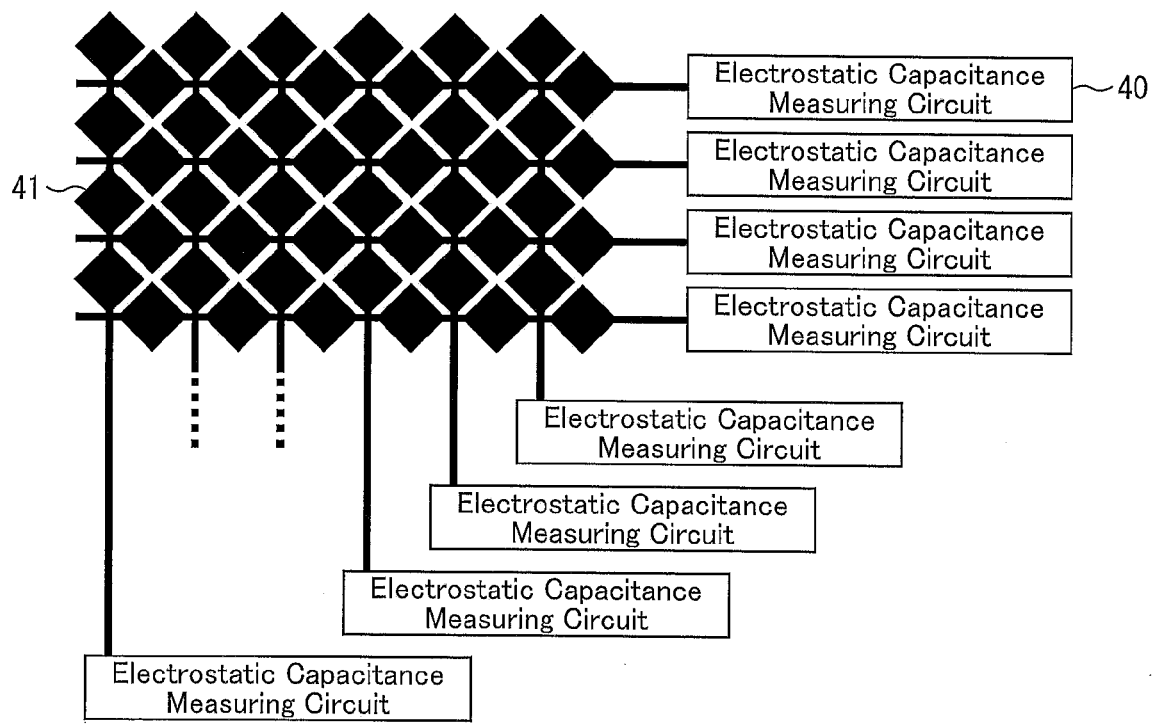
FIG. 9 is a view illustrating an arrangement of electrostatic capacitance measuring circuits used when electrostatic capacitance is measured by a direct measuring method.
Figure 10:
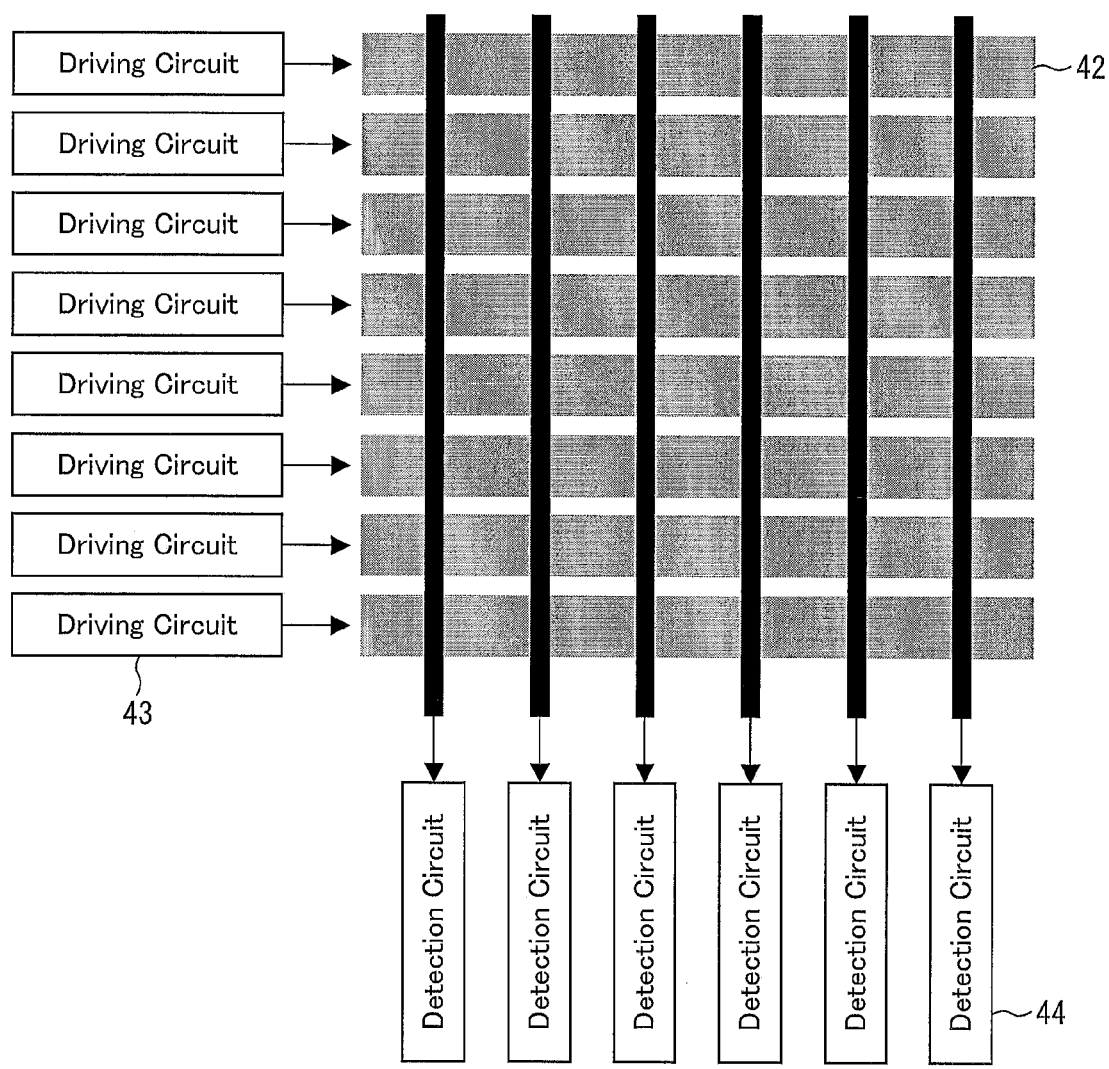
FIG. 10 is a view illustrating a circuit configuration used when electrostatic capacitance is measured by a transferred electric charge measuring method.

According to a projection type and electrostatic capacitance type touch panel, a change in electrostatic capacitance is mainly detected by the following two methods: i.e., (i) a method in which electrostatic capacitance is directly measured (Absolute Capacitive Sensing) (hereinafter, referred to as "direct measuring method") and (ii) a method in which a pulse voltage is applied in any one of an X direction and a Y direction and an electric charge transferred thereby is measured (Transcapacitive Sensing) (hereinafter, referred to as "transferred electric charge measuring method"). FIG. 9 is a view illustrating a configuration of an electrostatic capacitance measuring circuit used when electrostatic capacitance is measured by the direct measuring method. FIG. 10 is a view illustrating a circuit configuration used when electrostatic capacitance is measured by the transferred electric charge measuring method.

According to the electrostatic capacitance measuring circuit which employs the direct measuring method as illustrated in FIG. 9, various methods have been proposed and have come into practical use. The following description will discuss, as an example, a Dual Ramp integrating method.

According to the method, an electrostatic capacitor to be measured is charged with a constant electric current (Q=constant) for a certain time period. Based on the theorem of Q=CV, a charged voltage becomes lower as the electrostatic capacitance becomes larger. In a case where the electrostatic capacitor to be measured is fully charged with a predetermined voltage after measuring a charging direction, a charged electric charge is discharged at the same electric current value and for the same time period.

After the electric charge is discharged, a residual voltage becomes high in a case where the electrostatic capacitance is large. In other words, an absolute value of a discharged voltage is low. Note that a changed amount of voltage on the charging side is equal to that on the discharging side. Note further that, in a case where a common mode noise is generated during a charging/discharging period, the common mode noise is offset. Alternatively, in a case where a normal mode noise is generated during the charging/discharging period, the normal mode noise is averaged and decreased.

Figure 11:
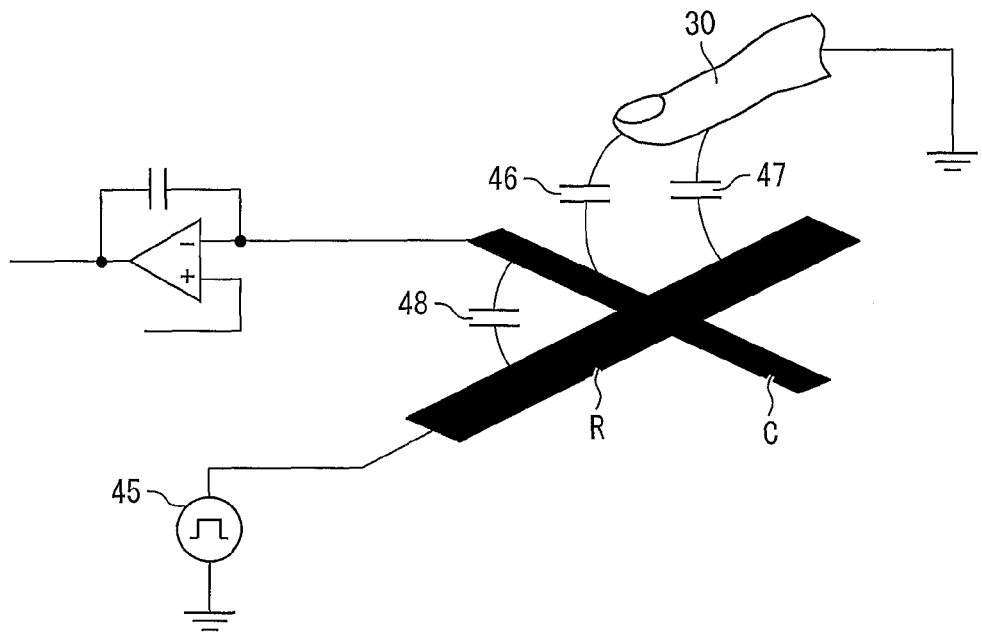
FIG. 11 is a view for explaining a concrete operation principle of the transferred electric charge measuring method illustrated in FIG. 10.

Meanwhile, according to the transferred electric charge measuring method illustrated in FIG. 10, pulses are sequentially applied in one direction, and then electric charges, which are induced in the other direction by applying the pulses, are measured. FIG. 11 illustrates a further concrete operation principle. In FIG. 11, "46" indicates an electrostatic capacitance between the finger 30 and a column direction R, "47" indicates an electrostatic capacitance between the finger 30 and a row direction C, "48" indicates an electrostatic capacitance between the row direction C and the column direction R, and "45" indicates a low impedance transmitter.

When the finger 30 is connected to ground, an amount of a pulse signal transferred from the liquid crystal module to a detection circuit 44 is decreased, and the detection circuit 44 detects the change (see FIG. 11). In a case of the transferred electric charge measuring method, each electrode is separately driven, and it is therefore possible to obtain a pattern of change in electrostatic capacitance which pattern is similar to that of an image sensor.

Figure 12:
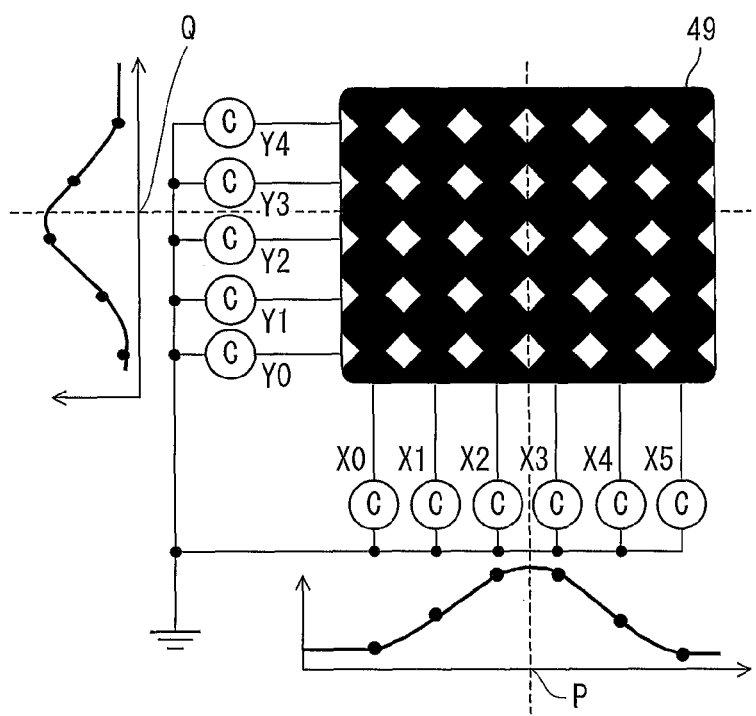
FIG. 12 illustrates results of measuring electrodes by the direct measuring method illustrated in FIG. 9.

FIG. 12 illustrates results on measuring the electrodes by the direct measuring method illustrated in FIG. 9. FIG. 12 illustrates measured results obtained by extracting only amounts of change caused by the finger. In a case where the finger touches (presses) a point on a touch panel 49, mount-like data (profile), whose peak corresponds to the point, can be obtained. In FIG. 12, data having its peak at a point P is obtained in the X direction, and data having its peak at a point Q is obtained in the Y direction. According to this method, it is possible to obtain, from a curve on the profile, information such as a center position of the finger, a thickness of the finger, and a width of the finger by calculation. Sensors are arranged in the X direction and in the Y direction at a pitch of several millimeters. This provides a resolution of 500 dpi or higher for detecting a finger location. In a case where the touch panel 49 is touched by a plurality of fingers, data is to indicate a plurality of peaks so that locations of the respective plurality of fingers can be detected.

Figure 13:
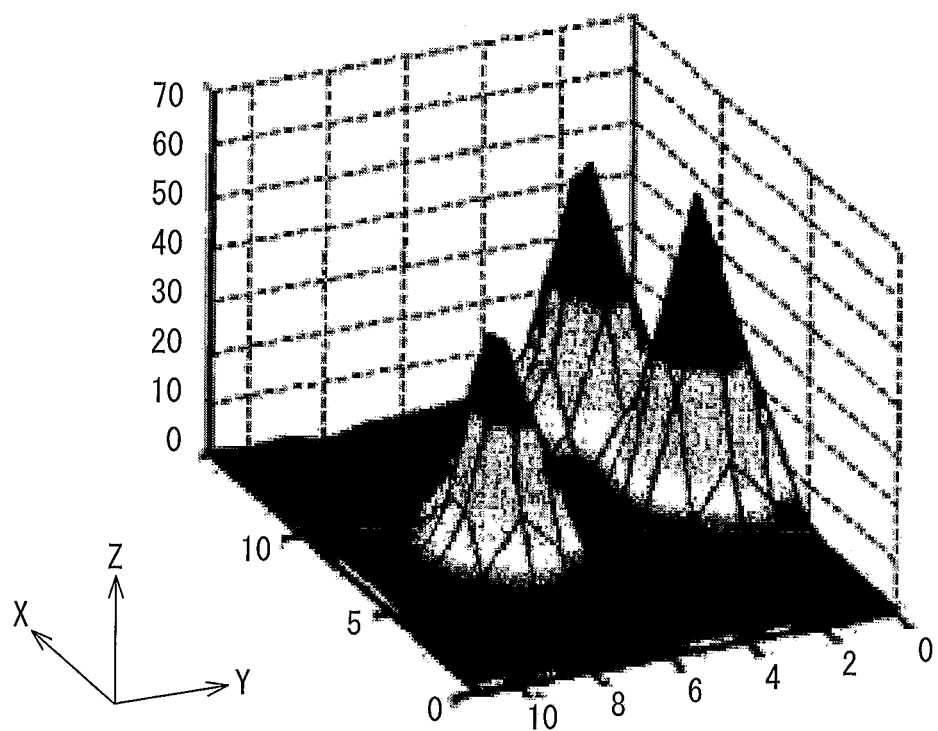
FIG. 13 is a three-dimensional graph illustrating results of measuring electrodes by the transferred electric charge measuring method.

FIG. 13 is a three-dimensional graph illustrating results of measuring electrodes by the transferred electric charge measuring method. FIG. 13 illustrates measured results obtained in a case where three fingers have touched the touch panel, where changed amounts of electrostatic capacitance are indicated in a Z-axis direction. According to the graph, mount-like data (profile) is obtained, whose peaks correspond to points at which the fingers press the touch panel, as with FIG. 12. From the data, information such as center positions of fingers are obtained with high resolution by calculation, as with the case illustrated in FIG. 12.

In the descriptions above, the operation principle of the capacitance type touch panel has been explained with reference to the concrete examples. Note, however, that the touch panel 11, which is applicable to the display device 1 of the present embodiment, is not limited to the touch panels that operate as above described.

(Program and Storage Medium)

Lastly, each constituent member included in the display device 1 can be configured by hardware logic, or realized by software with the use of a CPU as follows.

That is, the display device 1 includes a CPU, a ROM, a RAM, and a storage device (storage medium) such as a memory. The CPU executes instructions of programs for realizing the functions of the display device 1. In the ROM, the programs are stored. Into the RAM, the programs are loaded in executable format. In the storage device, the programs and various data are stored. With the configuration, the objective of the present invention can also be achieved by the predetermined storage medium.

The storage medium can store program codes (executable programs, intermediate code programs, source programs) of programs for the display device 1, which is configured by software for realizing the functions, so that a computer can read the program codes. The storage medium is provided in the display device 1 so that the display device 1 serving as the computer (or CPU or MPU) reads and executes the program codes stored in the storage medium thus provided in the display device 1.

The storage medium that supplies the program codes to the display device 1 is not limited to a particular structure or a particular type. That is, the storage medium can be, for example, a tape, such as a magnetic tape or a cassette tape; a disk including (i) a magnetic disk such as a Floppy (Registered Trademark) disk or a hard disk and (ii) an optical disk such as CD-ROM, MO, MD, DVD, or CD-R; a card such as an IC card (memory card) or an optical card; or a semiconductor memory such as a mask ROM, EPROM, EEPROM, or flash ROM.

Moreover, the objective of the present invention can also be achieved by configuring the display device 1 to be connected to a communications network so that the program codes are supplied to the display device 1 via the communications network. The communications network is not limited to a particular type or form, provided that the communications network can supply the program codes to the display device 1. For example, the communications network can be the Internet, an intranet, extranet, LAN, ISDN, VAN, CATV communications network, virtual private network, telephone line network, mobile communications network, or satellite communications network.

A transfer medium which constitutes the communications network is not limited to a specific configuration or a type, provided that the transfer medium can transfer the program codes. For example, the transfer medium can be a wired line such as IEEE 1394, USB, electric power line, cable TV line, telephone line, or ADSL (Asymmetric Digital Subscriber Line) line; or wireless such as infrared radiation (IrDA, remote control), Bluetooth (Registered Trademark), 802.11 wireless, HDR, mobile telephone network, satellite line, or terrestrial digital network.

EXAMPLE

Example 1

In Example 1, a display device was used which had a configuration similar to that of the display device 1 illustrated in FIG. 3 in which the switches 22 are provided for the respective source lines connected with the pixels for displaying R, G, and B, and a plurality of source lines corresponding to any of R, G, and B were driven for each of the colors R, G, and B in this order during one (1) horizontal scanning period. As a driving pattern, a column reversal driving was employed in which a polarity is reversed for each source line, and voltages applied to pixels were set to display a checkered pattern of white and black. Each one (1) horizontal scanning period was set to 19.2 μs. A time period from when a pixel voltage is supplied to source lines connected with R pixels to when a pixel voltage is supplied to source lines connected with G pixels was set to 6.4 μs. A time period from when the pixel voltage is supplied to the source lines connected with the G pixels to when a pixel voltage is supplied to source lines connected with B pixels was set to 6.4 μs. A time period from when the pixel voltage is supplied to the source lines connected with the B pixels to when a pixel voltage is supplied to the source lines connected with the R pixels in a following horizontal scanning period was set to 6.4 μs.

Figure 14:
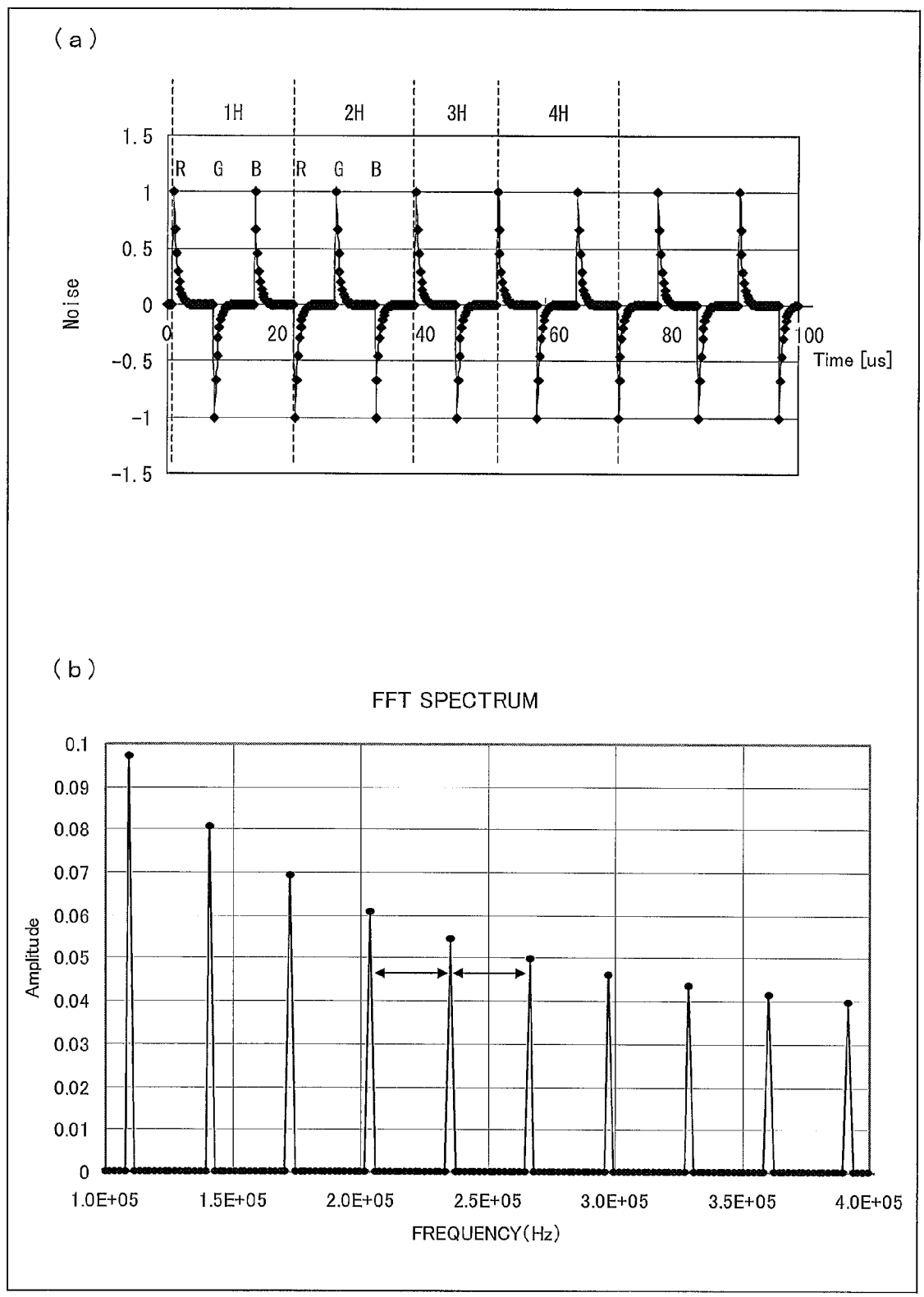
FIG. 14 illustrates (a) a waveform of a drive noise caused in a liquid crystal panel by an operation of Example 1 and (b) a frequency spectrum obtained by fast Fourier transform of the drive noise.

(a) of FIG. 14 illustrates a waveform of a drive noise generated in the liquid crystal panel when the driving is carried out as above described. (b) of FIG. 14 illustrates a frequency spectrum obtained by fast Fourier transform of the drive noise.

In Example 1, one (1) horizontal scanning period was evenly divided so that the source lines provided for each of R, G, and B were switched at even intervals. This caused peaks of noise in the drive noise spectrum to be concentrated on a single polar (see (b) of FIG. 14). As such, the source lines were driven in an even time division manner for each of R, G, and B, and it was therefore possible to secure a sufficient interval between the peaks.

Figure 15:
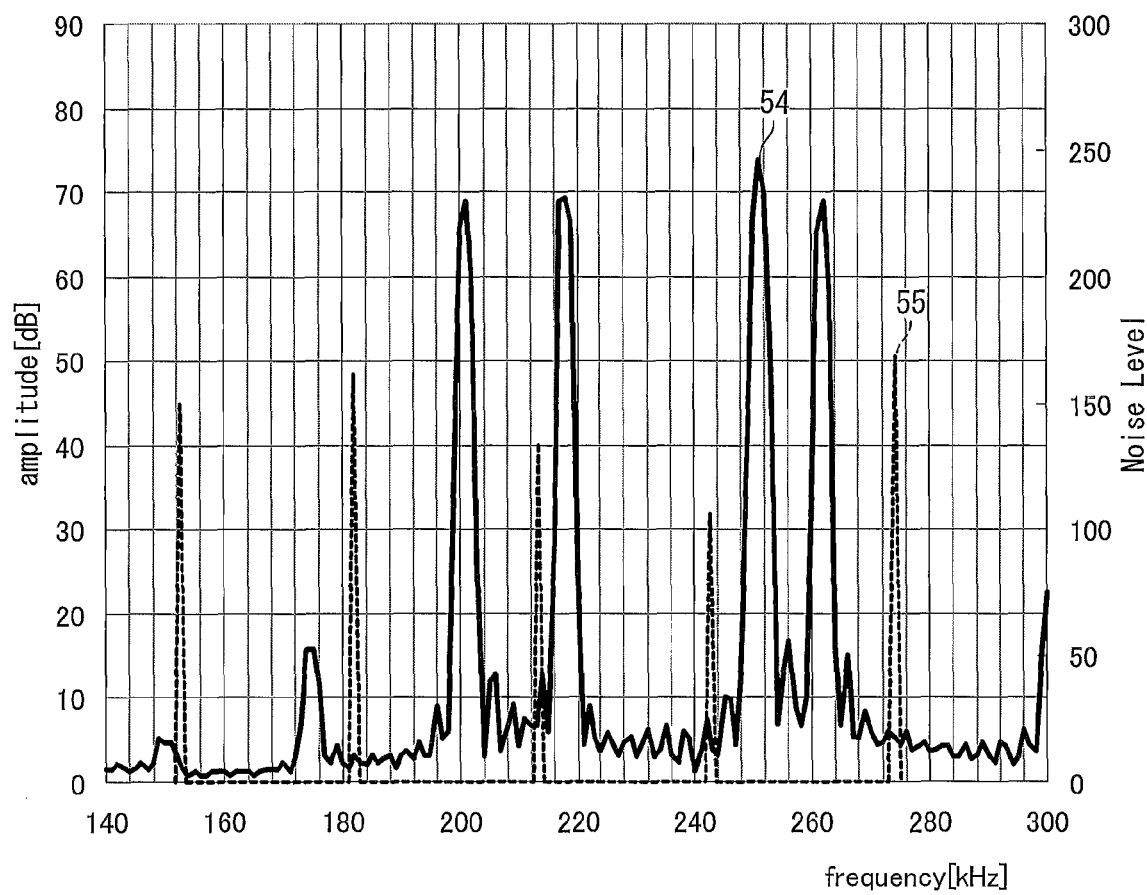
FIG. 15 is a graph illustrating a noise sensing characteristic of a touch panel and a drive noise spectrum of the liquid crystal panel in Example 1.

Then, such a noise waveform and noise sensing characteristics of the touch panel were compared with each other. FIG. 15 is a graph illustrating a noise sensing characteristic of a touch panel and a drive noise spectrum of the liquid crystal panel. In FIG. 15, the noise sensing characteristic of the touch panel is indicated by "54", and the drive noise spectrum of the liquid crystal panel is indicated by "55".

The noise sensing characteristic of the touch panel is a frequency characteristic of a drive noise sensed by the touch panel. Specifically, the noise sensing characteristic indicates a noise level of the touch panel with respect to each frequency in a case where only a frequency of a waveform of a noise signal, which is applied to a conductor that comes close to the touch panel, is changed.

As illustrated in FIG. 15, according to the driving method of Example 1, the drive noise spectrum of the liquid crystal panel is concentrated on a single polar, and it is therefore possible to prevent the drive noise spectrum from interfering with the noise sensing characteristic of the touch panel. In other words, it is possible to easily cause a timing at which the drive noise is generated in the liquid crystal panel to be different from a timing at which the touch panel carries out sensing. This allows a reduction in noise that is detected by the touch panel.

(Additional Remarks)

As above described, the display device of the present invention includes: a liquid crystal panel for displaying an image based on image data supplied from outside, the liquid crystal panel having a plurality of source lines, along each of which pixels are aligned for displaying an identical one of a plurality of different primary colors; a touch panel for detecting a change in electrostatic capacitance, the touch panel being provided so as to be attached to the liquid crystal panel; and source signal outputting means for outputting source signals, which correspond to the image data, to all the plurality of source lines during one (1) horizontal scanning period, the source signal outputting means substantially evenly dividing one (1) horizontal scanning period into sub-periods, the number of which is equal to or larger than a multiple of the number of the plurality of different primary colors, and in each of sub-periods (i) which are among all the sub-periods and (ii) the number of which is identical with the multiple, the source signal outputting means supplying a source signal to source lines (i) which are connected with pixels for displaying a certain one of the plurality of different primary colors and (ii) the number of which is obtained by dividing a total number of the plurality of source lines by the multiple.

In order to attain the object, the driving method of the present invention is a method for driving a display device including (i) a liquid crystal panel for displaying an image based on image data supplied from outside, the liquid crystal panel having a plurality of source lines, along each of which pixels are aligned for displaying an identical one of a plurality of different primary colors and (ii) a touch panel for detecting a change in electrostatic capacitance, the touch panel being provided so as to be attached to the liquid crystal panel, the method including the step of: outputting source signals, which correspond to the image data, to all the plurality of source lines during one (1) horizontal scanning period, in the outputting step, one (1) horizontal scanning period being substantially evenly divided into sub-periods, the number of which is equal to or larger than a multiple of the number of the plurality of different primary colors, and in each of sub-periods (i) which are among all the sub-periods and (ii) the number of which is identical with the multiple, a source signal being supplied, in the outputting step, to source lines (i) which are connected with pixels for displaying a certain one of the plurality of different primary colors and (ii) the number of which is obtained by dividing a total number of the plurality of source lines by the multiple.

According to the configuration, the display device includes the liquid crystal panel and the touch panel such that, in a case where a human finger or the like touches the liquid crystal panel, on which an image is displayed, via the touch panel, a location of the human finger or the like is detected by the touch panel. Each of the pixels of the liquid crystal panel is provided for displaying any of the plurality of different primary colors, and pixels, which are provided along one (1) source line are pixels for displaying an identical primary color.

With the configuration, when the display device drives all the source lines during one (1) horizontal scanning period, the source lines are driven while the one (1) horizontal scanning period is substantially evenly divided into the sub-period, the number of which is equal to or larger than a multiple. Specifically, one (1) horizontal scanning period is substantially evenly divided into sub-periods the number of which is equal to or larger than the multiple of the number of primary colors, and in each of sub-periods (i) which are among all the sub-periods and (ii) the number of which is identical with the multiple, a source signal is supplied to source lines (i) which are connected with pixels for displaying a certain primary color and (ii) the number of which is obtained by dividing a total number of the plurality of source lines by the multiple.

As such, in a case where source signals are supplied while one (1) horizontal scanning period is substantially evenly divided, it is possible to concentrate peak frequency bands of a drive noise which is generated in the liquid crystal panel. As such, a drive noise is generated at substantially even intervals in one (1) horizontal scanning period, and it is therefore possible to easily cause the frequency of the noise to be different from a sensing frequency of the touch panel. This makes it possible to detect an input operation with high accuracy.

According to the display device of the present invention, it is preferable that the plurality of different primary colors are red (R), green (G), and blue (B).

As such, the liquid crystal panel has the pixels for displaying the three primary colors, i.e., R, G, and B, and one (1) horizontal scanning period is substantially evenly divided by 3 or a multiple of 3 when the source lines are driven. This makes it possible to concentrate the peak frequency bands of the drive noise on a single polar. This allows suppression in interference with respect to a frequency band of a noise sensed by the touch panel, and it is therefore possible to achieve high detection accuracy.

According to the display device of the present invention, it is preferable that the source signal outputting means supplies the source signal to source lines connected with pixels for displaying blue (B) at an end of one (1) horizontal scanning period.

With reference to applied-voltage-time characteristics of R, G, and B, a transmittance of blue (B) is low in voltage at which the transmittance reaches its peak, as compared to transmittances of red (R) and green (G). It is therefore possible to apply a voltage sufficient to display blue even with short charging time.

As above described, in the present invention, one (1) horizontal scanning period is substantially evenly divided and a voltage is applied to pixels corresponding to each of the primary colors. With the configuration, no voltage is applied to a gate line at the end of the one (1) horizontal scanning period, and charging time of pixels is therefore short. However, in a case where a source signal is supplied to source lines connected with the blue (B) pixels, which can be sufficiently charged in short time in the last sub-period of one (1) horizontal scanning period, it is possible to display an intended color.

It is preferable that the touch panel detects the change in electrostatic capacitance at a timing which is different from a timing at which the source signal is supplied to any of the plurality of source lines.

According to the configuration, it is possible to prevent the touch panel from detecting a liquid crystal drive noise generated when outputting of source signal is switched. This allows a further improvement in detection accuracy of the touch panel.

Note that the display device can be realized by a computer. In this case, the scope of the present invention encompasses (i) a program for causing the computer to serve as the means of the display device and (ii) a computer-readable storage medium storing the program.

The present invention is not limited to the embodiments, but can be altered by a skilled person in the art within the scope of the claims. an embodiment derived from a proper combination of technical means disclosed in respective different embodiments is also encompassed in the technical scope of the present invention.

INDUSTRIAL APPLICABILITY

The present invention is suitably applicable to various electronic apparatuses, such as a mobile phone, a personal computer, and a music player, each of which includes a capacitance type touch panel.

REFERENCE SIGNS LIST

1: Display device
10: Liquid crystal panel
11: Touch panel
12: Liquid crystal panel controller
13: Touch panel controller
14: System clock generator
15: Oscillating section
17: Output switching section
20: Source driver (source signal outputting means)
21: Gate driver

The invention claimed is:

1. A display device comprising:
a liquid crystal panel configured to display an image based on image data supplied from outside, the liquid crystal panel having a plurality of source lines, along each of which pixels are aligned to display an identical one of a plurality of different primary colors;
a touch panel configured to detect a change in electrostatic capacitance, the touch panel being provided so as to be attached to the liquid crystal panel; and
a source signal outputting device configured to output source signals, which correspond to the image data, to all the plurality of source lines during one (1) horizontal scanning period, the plurality of source lines are respectively connected to switches which are controlled by switch selection lines connected to the switches such that the plurality of source lines will be driven sequentially through operation of the switches by ensuring that one of the switches is in an ON state while others of the switches are in an OFF state, wherein
the source signal outputting device substantially evenly divides one (1) horizontal scanning period into sub-periods, the number of which is equal to or larger than a multiple of the number of the plurality of different primary colors,
in each of sub-periods (i) which are among all the sub-periods and (ii) the number of which is identical with the multiple, the source signal outputting device supplying a source signal to source lines (i) which are connected with pixels which display a certain one of the plurality of different primary colors and (ii) the number of which is obtained by dividing a total number of the plurality of source lines by the multiple,
the plurality of different primary colors are red (R), green (G), and blue (B), and
the source signal outputting device supplies the source signal to source lines connected with pixels configured to display blue (B) at an end of one (1) horizontal scanning period; and wherein the touch panel detects the change in electrostatic capacitance at a timing which is different from the timing at which the source signal is supplied to any of the plurality of source lines.

\* \* \* \* \*